(12) United States Patent
Sugiyama (10) Patent No.: US 6,483,269 B2
(45) Date of Patent: Nov. 19, 2002

(54) CONTROL APPARATUS FOR AUTOMATIC LATHE

(75) Inventor: Tetsuya Sugiyama, Shizuoka (JP)

(73) Assignee: Star Micronics Co., LTD, Shizuoka (JP)

( * ) Notice: Subject to any disclaimer, the term of this patent is extended or adjusted under 35 U.S.C. 154(b) by 0 days.

(21) Appl. No.: 09/880,940

(22) Filed: Jun. 15, 2001

(65) Prior Publication Data

US 2001/0052757 A1 Dec. 20, 2001

(30) Foreign Application Priority Data

Jun. 16, 2000 (JP) ........................................ 2000-181978

(51) Int. Cl.⁷ .............................................. G05B 19/18
(52) U.S. Cl. ................. 318/569; 318/568.1; 318/568.2; 318/567; 700/172
(58) Field of Search ............................. 318/569, 568.1, 318/568.2, 567; 700/172

(56) References Cited

U.S. PATENT DOCUMENTS 5,084,660 A * 1/1992 Sasaki et al. ................ 318/569
5,278,766 A * 1/1994 Takahashi ................... 318/569

* cited by examiner

Primary Examiner—Karen Masih
(74) Attorney, Agent, or Firm—Morgan Lewis & Bockius LLP (57) ABSTRACT

A control apparatus for an automatic lathe includes a numerical controller, and comprises an input device, a readout section, and a machining program storage section. The input device inputs a machining program expressed by a predetermined language. The readout section reads out the machining program from the input device and digitizes it. The machining program storage section stores the digitized machining program into a timing table form in the order of execution. From the machining program storage section, various kinds of data such as the positional data of tools stated in the stored machining program, rotational data and movement data of a workpiece, and the like are sent out to an editing section. In the editing section, these various kinds of data are reedited and stored by a movement data editing portion. The movement data editing portion determines the movement starting timing of tools such that the tool chosen in a later machining process reaches its machining operation starting position at a machining operation timing instructed by the machining program and at a predetermined speed lower than a speed instructed by the machining program.

4 Claims, 10 Drawing Sheets

| TOOL 101 | |
|---|---|
| TIMING | POSITION |
| ⋮ | ⋮ |
| $T_0$ | $P_0$ |
| $T_1$ | $P_1$ |
| $T_2$ | $P_2$ |
| ⋮ | ⋮ |

| TOOL 101 | |
|---|---|
| TIMING | POSITION |
| ⋮ | ⋮ |
| $t_0$ | $P_0$ |
| $t_1$ | $P_1$ |
| $T_1$ | $P_1$ |
| $T_2$ | $P_2$ |
| ⋮ | ⋮ |

CONTROL APPARATUS FOR AUTOMATIC LATHE

BACKGROUND OF THE INVENTION

1. Field of the Invention

The present invention relates to a control apparatus for an automatic lathe, which is used for successively choosing a plurality of tools one by one and machining a workpiece into a desirable form according to a machining program.

2. Related Background Art

Figure 13:
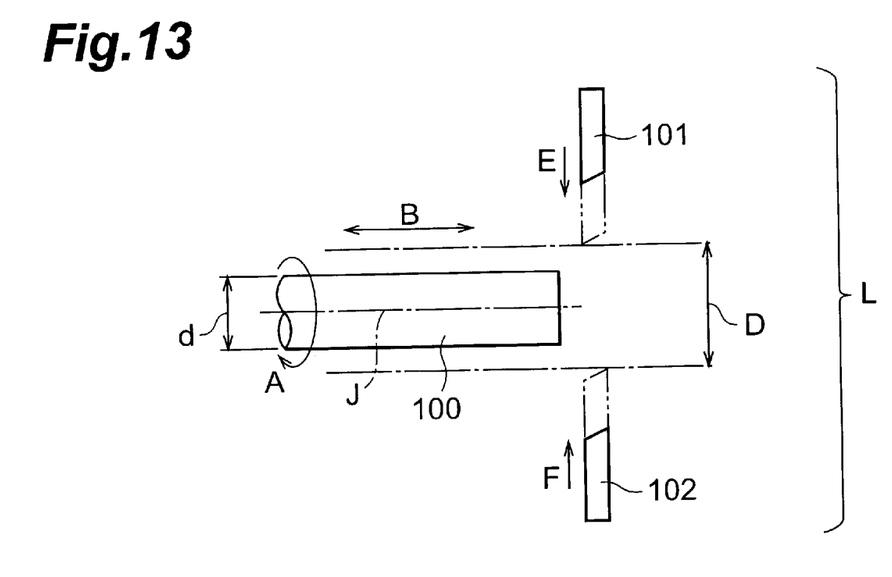
FIG. 13 is a diagram showing a part of a common automatic lathe.
Figure 14:
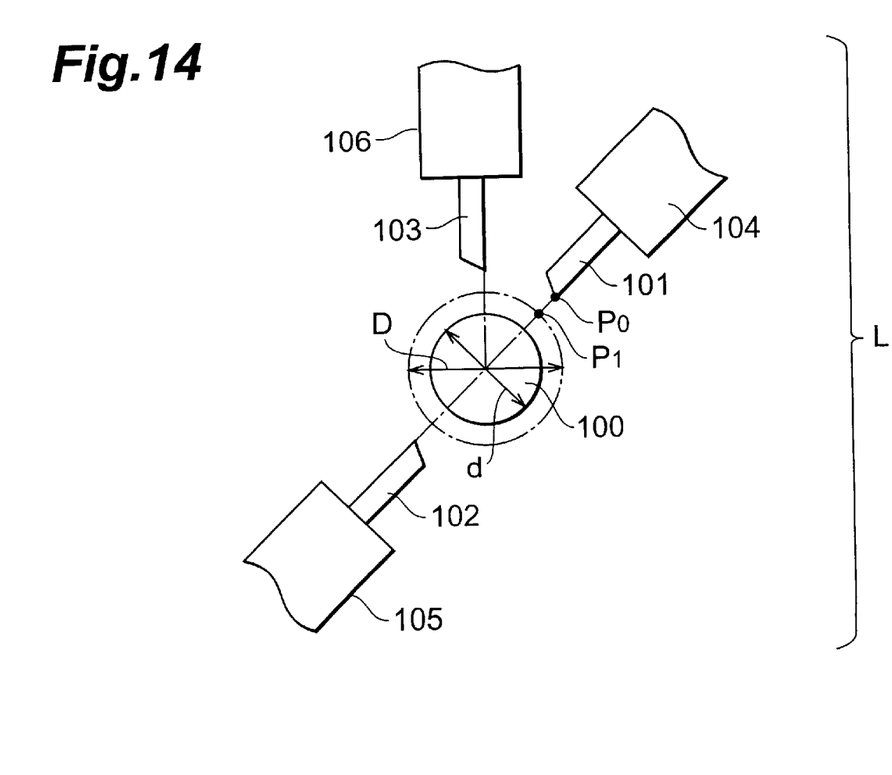
FIG. 14 is a diagram showing a part of the common automatic lathe.

With reference to FIGS. 13 and 14, the configuration of a conventional automatic lathe, e.g., Swiss type automatic lathe, will be explained. In an automatic lathe L, a workpiece 100 is driven to rotate in the direction of arrow A about a center axis of rotation J, while being movable in the directions of arrow B. An area slightly wider than the outside diameter d of the workpiece 100 is defined as a machining area D. Tools move within the machining area D at a predetermined machining speed, thereby machining the workpiece 100. A plurality of tools 101, 102 are disposed perpendicular to the center axis of rotation J. According to machining instructions, the tools 101, 102 move in the directions of arrows E, F, respectively, from their retracted positions indicated by solid lines in FIG. 13.

The tools 101, 102 are rapidly fed until they reach the machining area D (until they reach their respective positions indicated by dash-double-dot lines from the positions indicated by solid lines in FIG. 13), since they are unrelated to the machining of the workpiece 100 until then. The rapid feeding speed has been set for each of the tools 101, 102 by a machining program beforehand. The starting timing for rapid feeding is set in the machining program as well. Also, as shown in FIG. 14, a tool 103 is disposed near the tool 101. As with the tools 101, 102, the tool 103 moves from its retracted position according to a machining instruction. The tool 103 is rapidly fed until it reaches the machining area D.

As shown in FIG. 14, the tool 101 is held by a tool holder 104. Similarly, the tools 102, 103 are held by tool holders 105, 106, respectively. The tool holders 104, 105, 106 move together with their corresponding tools 101, 102, 103.

Figure 15:
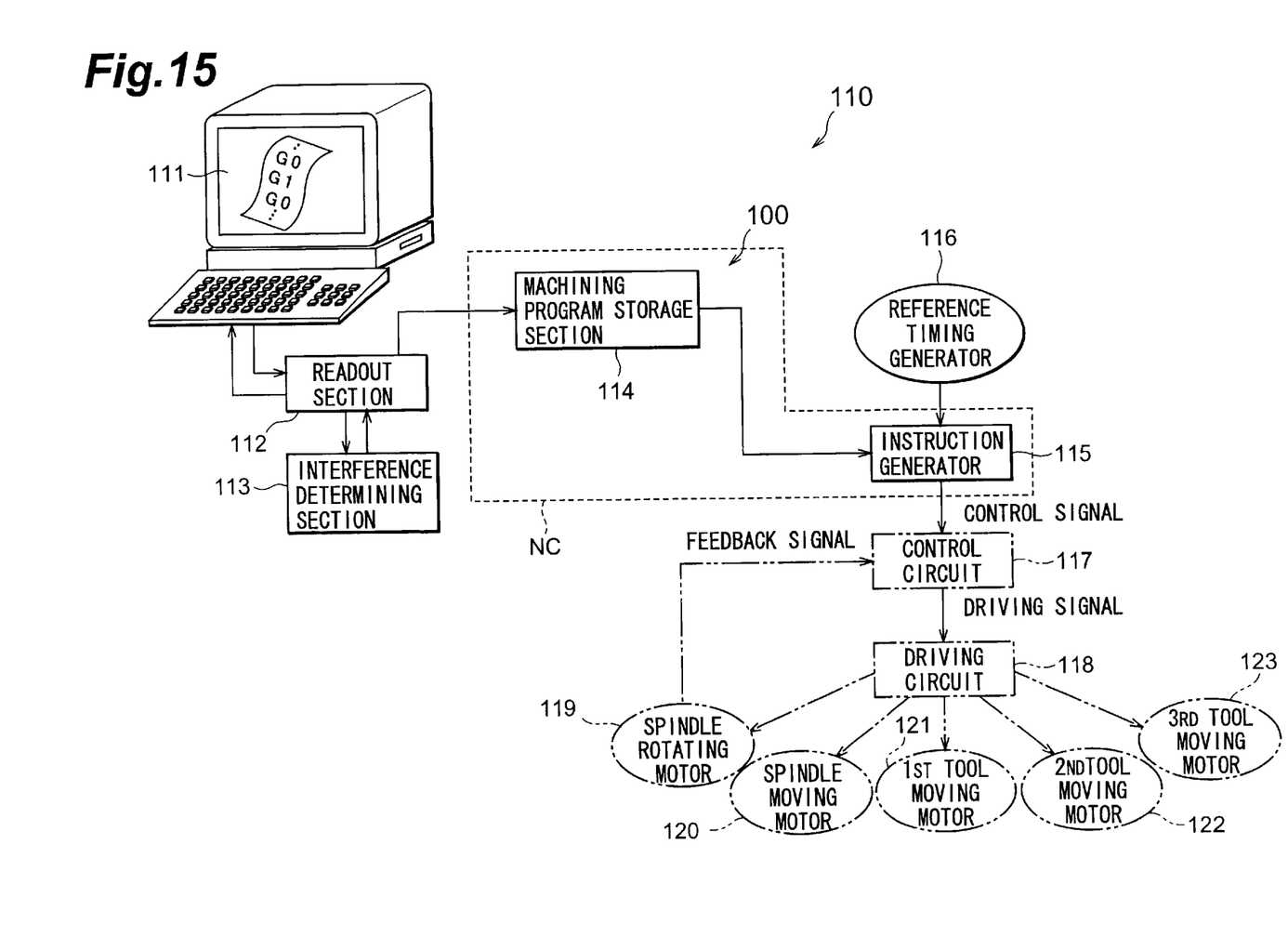
FIG. 15 is a block diagram showing the configuration of a conventional control apparatus for an automatic lathe.

Now, with reference to FIG. 15, a control apparatus for an automatic lathe in a conventional technique will be explained. A control apparatus 110 for the automatic lathe L includes a numerical controller NC. The control apparatus 110 comprises an input device 111 for inputting a machining program expressed by a predetermined language, a readout section 112 for reading out the machining program from the input device 111 and digitizing it, and a machining program storage section 114 for storing the digitized machining program into a timing table form in the order of execution.

Here, an example of mode of storage in a timing table form in the machining program storage section 114 will be explained with reference to FIG. 16. The machining program storage section 114 memorizes that the tool 101 is located at its retracted position $P_0$ at the point of timing to indicated by time, is placed at its machining operation starting position $P_1$ at the point of timing $t_1$ and maintained there until the point of timing $T_1$, and is located at a position $P_2$ within the machining area D at the point of timing $T_2$.

An interference determining section 113 is connected to the readout section 112. The interference determining section 113 determines whether the inputted machining program is appropriate or not, and further determines whether interference occurs or not among individual movable parts of mechanisms in the automatic lathe when the machining proceeds according to the machining program. The result of determination in the interference determining section 113 is fed back to the input device 111. Here, data concerning the machining program determined by the interference determining section 113 to generate no interference are stored into the machining program storage section 114.

The machining program storage section 114 sends out the positional data of tools 101, 102, 103 stated in the stored machining program, rotational data and movement data of the workpiece 100, and the like to an instruction generator 115 according to the order of proceeding of program.

The instruction generator 115 converts thus received positional data of tools 101, 102, 103, rotational data and movement data of the workpiece 100, and the like into control signals of their corresponding motors. While receiving reference timing signals from a reference timing generator 116 which designates actual driving timings, the instruction generator 115 sends out the control signals to a control circuit 117 in synchronization with the proceeding of reference timing signals. An example of the control signals is a driving pulse signal for a predetermined motor.

While receiving feedback signals from a spindle rotating motor 119, the control circuit 117 functions to correct deviations from the inputted control signals such as driving pulse signals and outputs driving signals to a driving circuit 118. The spindle rotating motor 119 drives the workpiece 100 to rotate. Here, feedback signals from a spindle moving motor 120 for moving the workpiece 100 in the directions of arrow B, a first tool moving motor 121 for controlling the advancement and retraction of tool 101, a second tool moving motor 122 for controlling the advancement and retraction of tool 102, and a third tool moving motor 123 for controlling the advancement and retraction of tool 103 may be fed into the control circuit 117, the driving circuit 118, and the like.

The driving circuit 118 controls exciting currents to the spindle rotating motor 119, spindle moving motor 120, first tool moving motor 121, second tool moving motor 122, and third tool driving motor 123, and so forth, thereby actually driving the individual motors 119, 120, 121, 122, 123.

Now, with reference to FIGS. 17 to 24, machining processes by thus configured automatic lathe L will be explained.

Figure 17:
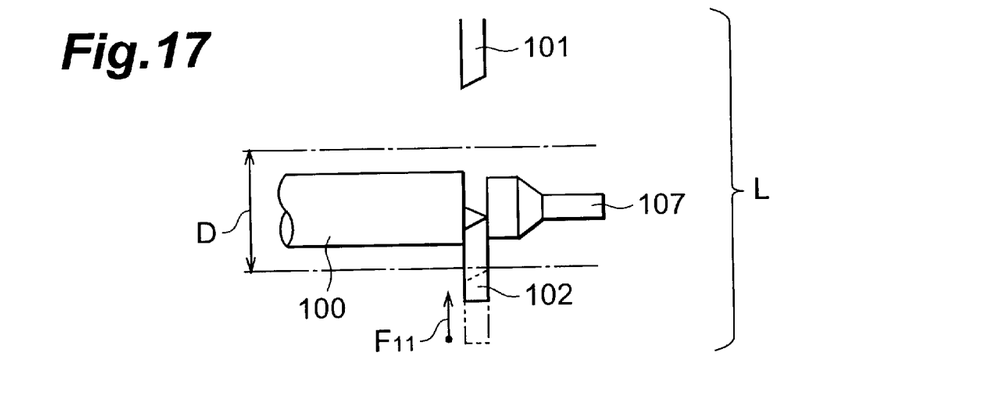
FIG. 17 is a view for explaining an example of machining processes by the conventional control apparatus for an automatic lathe.
Figure 18:
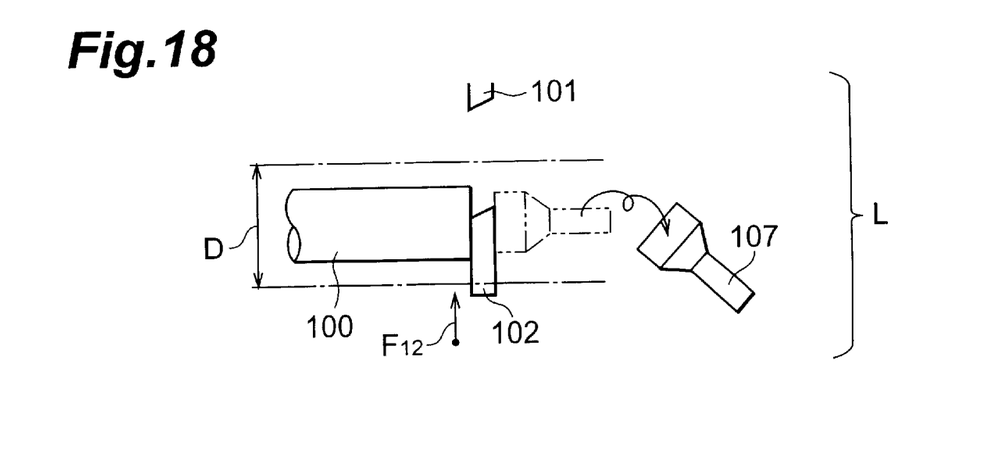
FIG. 18 is a view for explaining an example of machining processes by the conventional control apparatus for an automatic lathe.

First, FIG. 17 shows a "cutting-off process" in which the tool 102 severs an article 107 from the workpiece 100. The tool 102 moves at a predetermined machining speed in the direction of arrow $F_{11}$ from the machining operation starting position indicated by dash-double-dot lines. The tool 101 is located at the retracted position $P_0$ (see FIG. 13 or 14). Then, as shown in FIG. 18, the tool 102 moves in the direction of arrow $F_{12}$, whereby the article 107 is completely cut off. Here, the tool 101 is still located at the retracted position $P_0$ without moving.

Figure 19:
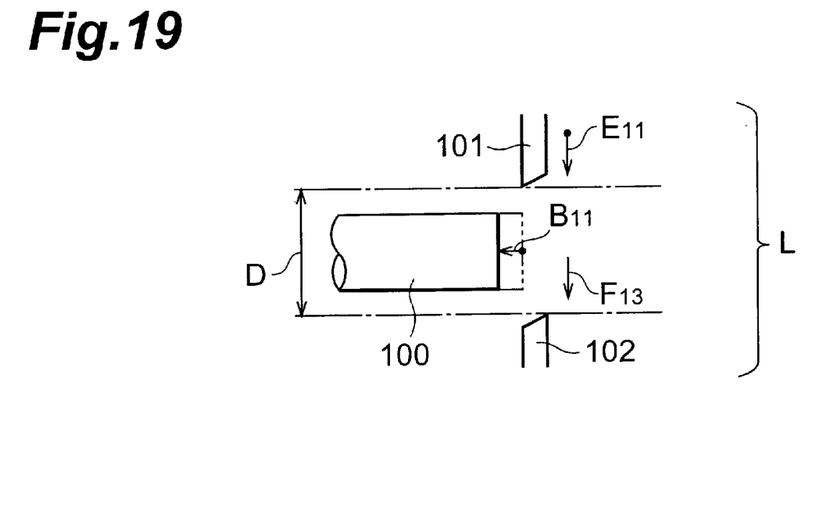
FIG. 19 is a view for explaining an example of machining processes by the conventional control apparatus for an automatic lathe.

FIG. 19 shows a state where initial positioning for carrying out the subsequent machining process is effected. The tool 102 moves in the direction of arrow $F_{13}$, so as to be positioned at the edge of machining area D. The tool 101 to be involved with the subsequent machining process moves at a rapid feeding speed in the direction of arrow $E_{11}$, so as to be positioned at the edge $P_1$ of machining area D (see FIG. 13 or 14). The workpiece 100 moves in the direction of arrow $B_{11}$, to a position indicated by a solid line. The completion of such initial positioning is governed by the most time-consuming one, whereas those having arrived earlier would wait at their reached positions.

Figure 20:
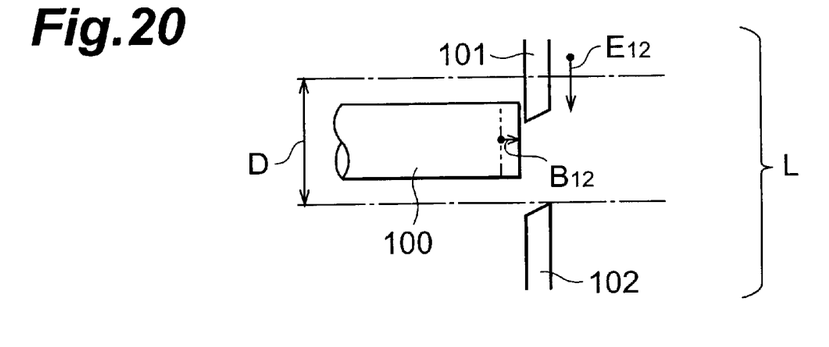
FIG. 20 is a view for explaining an example of machining processes by the conventional control apparatus for an automatic lathe.
Figure 21:
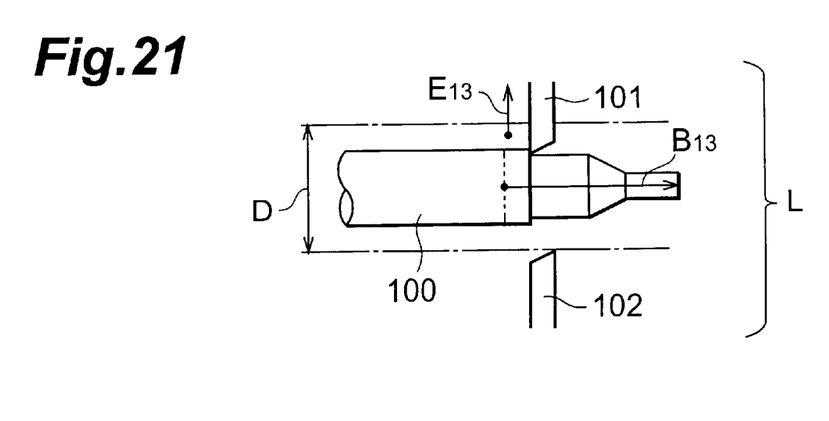
FIG. 21 is a view for explaining an example of machining processes by the conventional control apparatus for an automatic lathe.

FIG. 20 shows a state immediately before starting a "rough-cutting process" by the tool 101. The tool 101 moves in the direction of arrow $E_{12}$, thereby reaching a position immediately before starting an actual machining operation. The workpiece 100 moves in the direction of arrow $B_{12}$, thereby reaching a position immediately before starting the actual machining operation. FIG. 21 shows a state where the "rough-cutting process" by the tool 101 is completed. The workpiece 100 moves in the direction of arrow $B_{13}$ thereby reaching its actual machining operation ending position. The tool 101 moves in the direction of arrow $E_{13}$ according to the machining program as the time passes.

Figure 22:
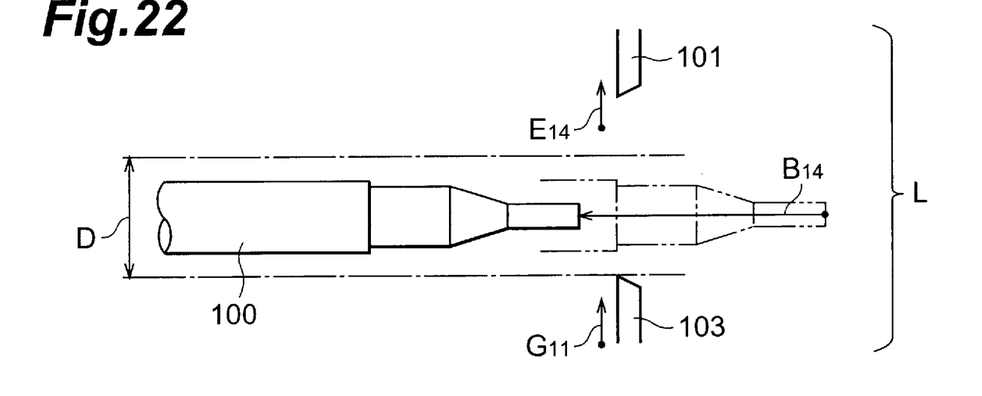
FIG. 22 is a view for explaining an example of machining processes by the conventional control apparatus for an automatic lathe.

FIG. 22 shows a state where initial positioning for carrying out the subsequent "finishing process" by the tool 103 is effected. The tool 103 moves at a rapid feeding speed in the direction of arrow $G_{11}$, thereby reaching the edge of machining area D. The workpiece 100 moves in the direction of arrow $B_{14}$, to a position indicated by a solid line. The tool 101 returns in the direction of arrow $E_{14}$ at a predetermined cutting speed within the machining area D and at a rapid feeding speed when letting out of the machining area D.

Figure 23:
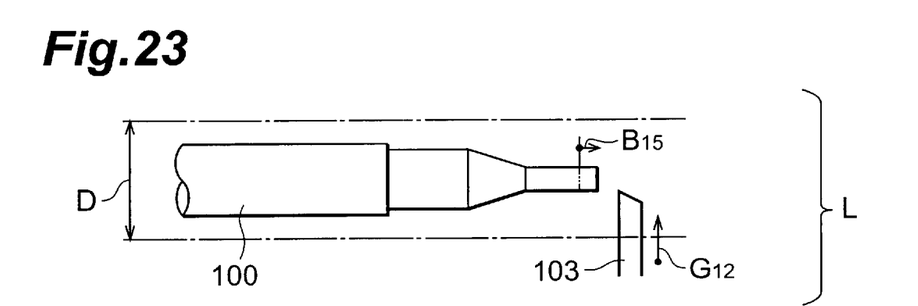
FIG. 23 is a view for explaining an example of machining processes by the conventional control apparatus for an automatic lathe.

FIG. 23 shows a state immediately before starting the "finishing process" by the tool 103. The tool 103 moves in the direction of arrow $G_{12}$, thereby reaching a position immediately before starting the actual machining operation. The workpiece 100 moves in the direction of arrow $B_{15}$, thereby reaching a position immediately before starting the actual machining operation.

Figure 24:
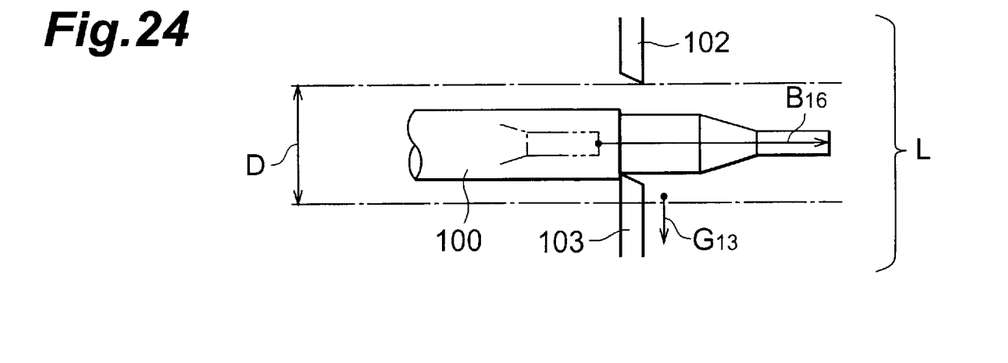
FIG. 24 is a view for explaining an example of machining processes by the conventional control apparatus for an automatic lathe.

Finally, FIG. 24 shows a state where the "finishing process" by the tool 103 is completed. The workpiece 100 moves in the direction of arrow $B_{16}$, thereby reaching its actual machining operation ending position. The tool 103 moves in the direction of arrow $G_{13}$ according to the machining program as the time passes. The tool 102 waits at the edge of machining area D (state shown in FIG. 19). Thereafter, the tool 103 returns to the most retracted position in order to keep it from interfering with the tool 101, whereas the machining process can return to the "cutting-off process" by the tool 102 shown in FIG. 17.

As explained above, according to the machining program, tools instructed to be chosen in a conventional common control apparatus for automatic lathes are moved to their machining operation starting positions and are kept waiting there until a timing for starting a machining operation, at which they are caused to carry out the machining operation. The movement of tools to their positions for starting the machining operation is carried out at a rapid feeding speed instructed beforehand by the machining program. This is done in order to shorten the time required for moving the tools not involved with the actual machining.

In such a method, however, a difference in amount of abrasion occurs due to the difference in speed between parts used with rapid feeding operations and those used with machining operations in a tool moving mechanism such as a ball screw for moving a tool. The parts used with rapid feeding operations may yield a remarkably greater amount of abrasion. Therefore, as the operating time of tool moving mechanism is longer, the tool feeding is more likely to rattle near places where machining starts. Also, as the rapid feeding speed is higher, the residual vibration upon stopping is more likely to continue for a long time, and the vibration is further accelerated when the rattling exists. These lower the machining accuracy in the workpiece by tools.

SUMMARY OF THE INVENTION

In view of the foregoing, it is an object of the present invention to provide a control apparatus for an automatic lathe, which can restrain the machining accuracy of a workpiece from deteriorating, without increasing the machining time for the workpiece.

The present invention provides a control apparatus for an automatic lathe for successively choosing a plurality of tools one by one and machining a workpiece into a desirable form according to a machining program; the control apparatus comprising storage means for storing the machining program, editing means for editing movement data of the tools according to the machining program stored in the storage means, and control means for controlling a moving operation of the tools according to the movement data edited by the editing means; wherein the machining program includes at least a program for instructing a first machining process by a first tool and a program for instructing a second machining process by a second tool carried out subsequently to the first machining process; wherein the editing means determines a movement starting timing of the second tool such that at least the second tool reaches a machining operation starting position at a machining operation timing instructed by the machining program and at a predetermined speed lower than a speed instructed by the machining program, when the workpiece and the second tool are caused to reach respective machining operation starting positions in the second machining process after the first machining process is completed, and the editing means defines the movement starting timing and the predetermined speed as the movement data.

In the control apparatus for an automatic lathe in accordance with the present invention, when the chosen second tool is moved so as to reach its machining operation starting position between the first and second machining processes, the editing means changes the moving speed of second tool to a predetermined speed lower than the speed instructed beforehand by the machining program. As a consequence, abrasion is reduced in parts used with rapid feeding operations in tool moving mechanisms. Therefore, the residual vibration of second tool decreases when a rapid feeding operation switches to a machining operation near the machining operation starting position, whereby the operation of second tool is stabilized near the machining operation starting position. As a result of these, the machining accuracy of the workpiece can be restrained from deteriorating. Here, since the editing means determines the movement starting timing of second tool such that at least the second tool reaches the machining operation starting position at a machining operation timing instructed by the machining program and at a predetermined speed lower than a speed instructed by the machining program, the machining time required for machining the workpiece into a desirable form is restrained from increasing.

In the control apparatus in accordance with the present invention, the predetermined speed defined by the editing means may be a machining moving speed of the second tool from the machining operation starting position in the second machining process instructed by the machining program. As a consequence, the moving speed of second tool to the machining operation starting position thereof can be determined easily in a simple manner. Also, since the second tool reaches the machining operation starting position at the machining moving speed and enters the machining area to carry out the second machining process at the same speed, the operation of second tool becomes more stable, whereby the machining accuracy can further be improved.

In the control apparatus in accordance with the present invention, the editing means may determine whether the second tool interferes with the workpiece and the first tool or not after the second tool is started to move at the movement starting timing until the second tool reaches the machining operation starting position, and define the movement starting timing and the predetermined speed as the movement data when it is determined not. As a consequence, the second tool can securely be prevented from interfering with the workpiece and the first tool.

The present invention will become more fully understood from the detailed description given hereinbelow and the accompanying drawings. They are given by way of illustration only, and thus should not be considered limitative of the present invention.

Further scope of applicability of the present invention will become apparent from the detailed description given hereinafter. However, it is clear that the detailed description and specific examples, while indicating preferred embodiments of the invention, are given by way of illustration only, and various changes and modifications within the spirit and scope of the invention will become apparent to those skilled in the art from this detailed description.

DESCRIPTION OF THE PREFERRED EMBODIMENT

In the following, a preferred embodiment of the control apparatus for an automatic lathe in accordance with the present invention will be explained in detail with reference to the drawings.

An automatic lathe (e.g., Swiss type automatic lathe). used in this embodiment has a configuration identical to that of the common automatic lathe L shown in FIGS. 13 and 14. In the automatic lathe L, as shown in FIG. 13, a workpiece 100 is driven to rotate in the direction of arrow A about the center axis of rotation J, while being movable in the directions of arrow B. An area slightly wider than the outside diameter d of the workpiece 100 is defined as a machining area D. Tools move within the machining area D at a predetermined machining speed, thereby machining the workpiece 100. A plurality of tools 101, 102 are disposed perpendicular to the center axis of rotation J. According to machining instructions, the tools 101, 102 move in the directions of arrows E, F, respectively, from their retracted positions indicated by solid lines in FIG. 13.

As shown in FIG. 14, the tool 101 is held by a tool holder 104. Similarly, the tools 102, 103 are held by tool holders 105, 106, respectively. The tool holders 104, 105, 106 move together with their corresponding tools 101, 102, 103. Here, in the relationship between the tools 101 and 102, the tool 101 constitutes the first tool, whereas the tool 102 constitutes the second tool. In the relationship between the tools 101 and 103, on the other hand, the tool 101 constitutes the first tool, whereas the tool 103 constitutes the second tool.

Figure 1:
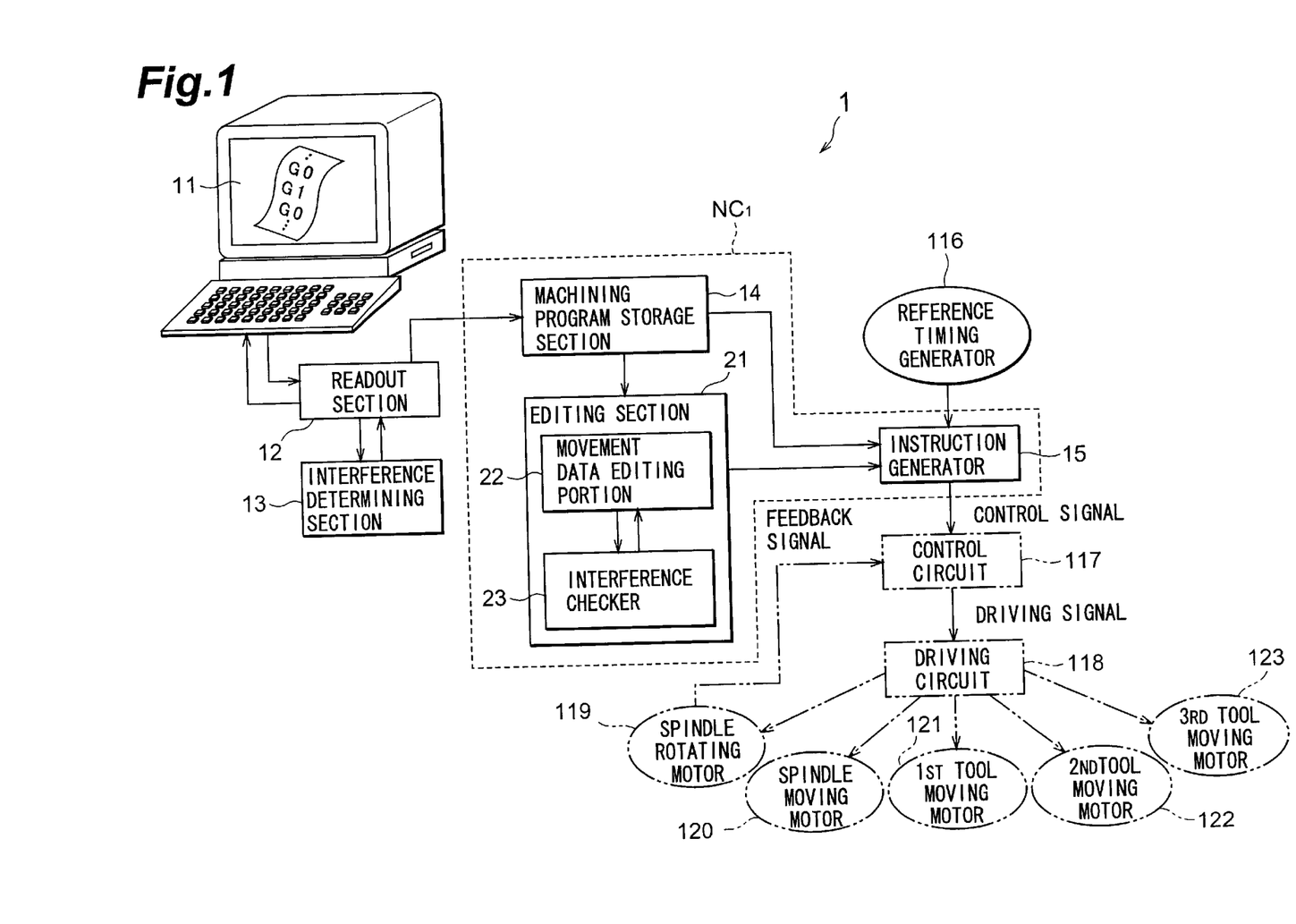
FIG. 1 is a block diagram showing the configuration of the control apparatus for an automatic lathe in accordance with an embodiment of the present invention.

A control apparatus 1 for the automatic lathe L includes a numerical controller $NC_1$. The control apparatus 1 comprises an input device 11 for inputting a machining program expressed by a predetermined language, a readout section 12 for reading out the machining program from the input device 11 and digitizing it, and a machining program storage section (storage means) 14 for storing the digitized machining program into a timing table form in the order of execution. The above-mentioned machining program includes a program for instructing a machining process by the tool 102, a program for instructing a machining process by the tool 101 carried out subsequently to the machining process by the tool 102, and a program for instructing a machining process by the tool 103 carried out subsequently to the machining process by the tool 101.

Figure 16:
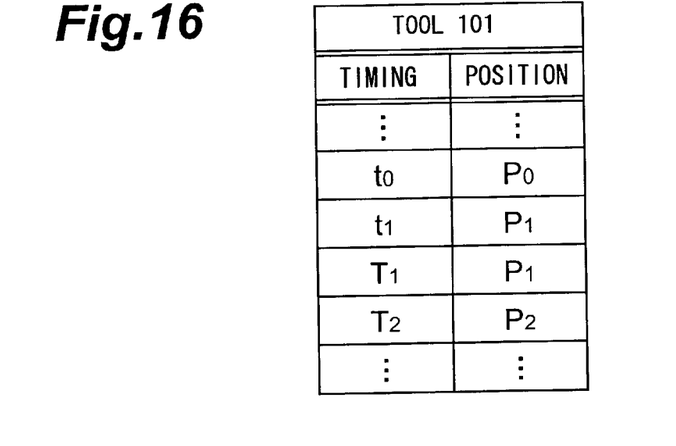
FIG. 16 is a table for explaining the configuration of a timing table in a machining program storage section included in the conventional control apparatus for an automatic lathe.

The mode of storage in a timing table form in the machining program storage section 14 is similar to the conventional one shown in FIG. 16. Namely, the machining program storage section 14 memorizes that the tool 101 is located at its retracted position $P_0$ at the point of timing to indicated by time, is placed at its machining operation starting position $P_1$ at the point of timing $t_1$ and maintained there until the point of timing $T_1$, and is located at a position $P_2$ within the machining area D at the point of timing $T_2$.

An interference determining section 13 is connected to the readout section 12. The interference determining section 13 determines whether the inputted machining program is appropriate or not, and further determines whether interference occurs or not among individual movable parts of mechanisms in the automatic lathe when the machining proceeds according to the machining program. The result of determination in the interference determining section 13 is fed back to the input device 11. Here, data concerning the machining program determined by the interference determining section 13 to generate no interference are defined and stored into the machining program storage section 14.

The machining program storage section 14 sends out the positional data of tools 101, 102, 103 stated in the stored machining program, rotational data and movement data of the workpiece 100, and the like to an instruction generator (control means) 15 according to the order of proceeding of program.

Also, the machining program storage section 14 sends out various kinds of data such as the positional data of tools 101, 102, 103 stated in the stored machining program, rotational data and movement data of the workpiece 100, and the like to an editing section 21 (editing means). In the editing section 21, these various kinds of data are reedited by a movement data editing portion 22, so as to be converted into and stored as a timing table such as that shown in FIG. 2, for example.

Figure 2:
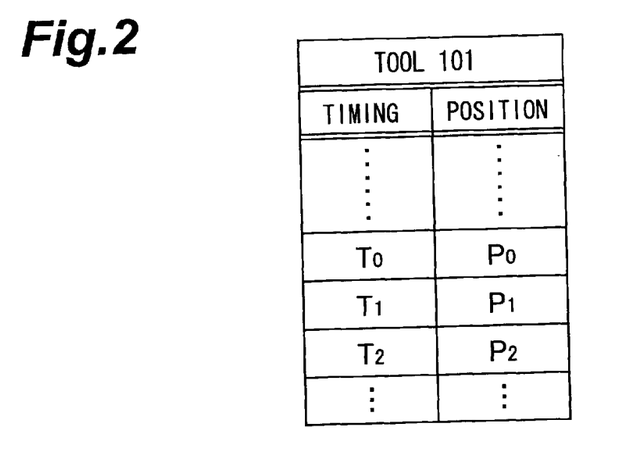
FIG. 2 is a chart for explaining the configuration of a timing table in a movement data editing portion included in the control apparatus for an automatic lathe in accordance with the embodiment of the present invention.

The movement data editing portion 22 memorizes, for example, that the tool 101 is located at the retracted position $P_0$ at the point of timing $T_0$ indicated by time, at the machining operation starting position $P_1$ at the point of timing $T_1$, and at the position $P_2$ within the machining area D at the point of timing $T_2$. The editing section 21 is connected to the instruction generator 15. The editing section 21 sends out the data stored in the movement data editing portion 22 to the instruction generator 15 according to the order of progress of timings $T_0$, $T_1$, $T_2$, . . . , concerning the machining.

The tools 101, 103 and tool holders 104, 106, which are disposed close to each other, may interfere with each other before they reach the machining area D or within the machining area D when moving toward the work piece 100. Namely, the tool 101 may interfere with the tool holder 106 in the process of moving from the retracted position $P_0$ to the machining operation starting position $P_1$ or in the state where it has entered the machining area D from the machining operation starting position $P_1$. Also, the tool holder 104 may interfere with the tool holder 106 in the process of moving from the retracted position $P_0$ to the machining operation starting position $P_1$ or in the state where it has entered the machining area D from the machining operation starting position $P_1$.

Therefore, the editing section 21 has an interference checker 23. The interference checker 23 determines whether interference occurs or not among individual movable parts of mechanisms of the automatic lathe when the machining is caused to proceed according to the timing table edited by the movement data editing portion 22 as the one shown in FIG. 2. The result of determination in the interference checker 23 is fed back to the movement data editing portion 22. Here, the data stored in the movement data editing portion 22 are subjected to interference determination by the interference checker 23, and only the data determined to generate no interference are stored.

The instruction generator 15 converts the positional data of tools 101, 102, 103, rotational data and movement data of the workpiece 100, and the like sent from the machining program storage section 14 and editing section 21 into control signals of their corresponding motors. Also, the instruction generator 15 receives reference timing signals from a reference timing generator 116 which designates actual driving timings, and sends out the control signals to a control circuit 117 in synchronization with the proceeding of reference timing signals. An example of the control signals is a driving pulse signal for a predetermined motor.

While receiving feedback signals from a spindle rotating motor 119, the control circuit 117 functions to correct deviations from the inputted control signals such as driving pulse signals and outputs driving signals to a driving circuit 118. The spindle rotating motor 119 drives the workpiece 100 to rotate. Here, feedback signals from a spindle moving motor 120 for moving the workpiece 100 in the directions of arrow B, a first tool moving motor 121 for controlling the advancement and retraction of tool 101, a second tool moving motor 122 for controlling the advancement and retraction of tool 102, and a third tool moving motor 123 for controlling the advancement and retraction of tool 103 may be fed into the control circuit 117, the driving circuit 118, and the like.

The driving circuit 118 controls exciting currents to the spindle rotating motor 119, spindle moving motor 120, first tool moving motor 121, second tool moving motor 122, and third tool driving motor 123, and so forth, thereby actually driving the individual motors 119, 120, 121, 122, 123.

Figure 3:
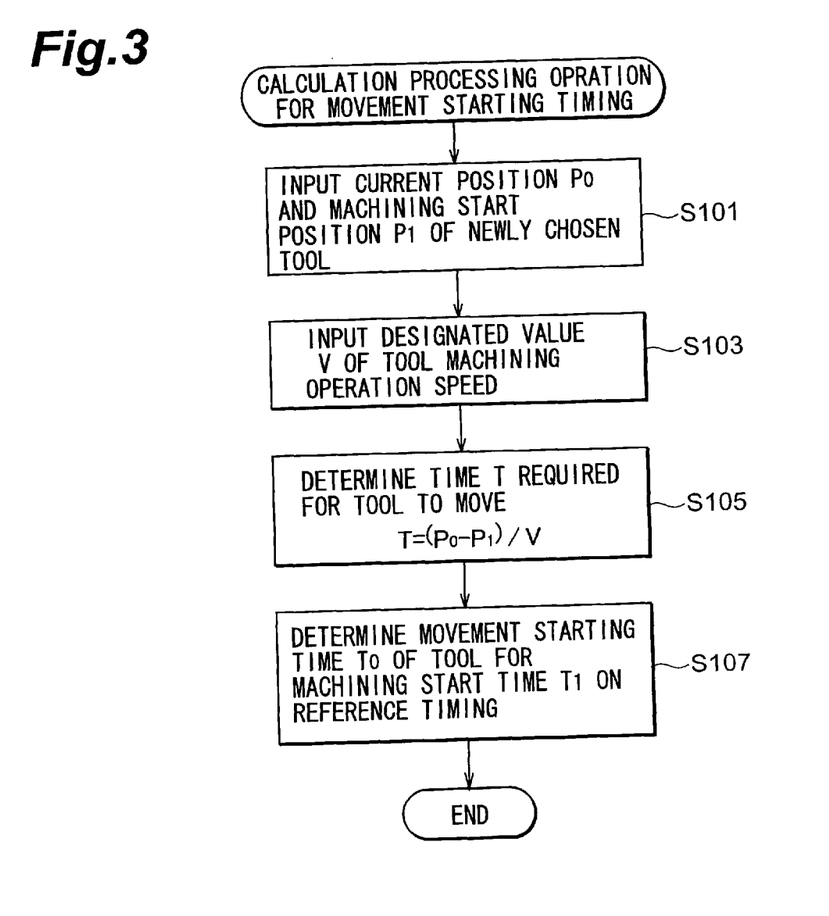
FIG. 3 is a flowchart for explaining a calculation processing operation for a movement starting timing executed in the movement data editing portion included in the control apparatus for an automatic lathe in accordance with the embodiment of the present invention.

Now, with reference to FIG. 3, a calculation processing operation for a movement starting timing executed in the movement data editing portion 22 will be explained.

First, at S101, the current position $P_0$ of a newly chosen tool (e.g., tool 101) and its machining operation starting position $P_1$ are inputted. At S103 subsequent thereto, a designated value V of the machining moving speed of tool is inputted. Here, the designated value V of machining moving speed of tool is the machining moving speed of the tool from the machining operation starting position instructed by the machining program.

After the current position $P_0$ and machining operation starting position $P_1$ of newly chosen tool and the designated value V of machining moving speed of tool are inputted, the flow proceeds to S105, at which the time T required for the tool to move from the current position $P_0$ to the machining operation starting position $P_1$ is determined according to the following expression (1):

$$T=(P_0-P_1)/V \qquad (1)$$

After the time T required for the tool to move is determined, the flow shifts to S107, at which the time $T_0$ when the tool starts moving on the reference timing is calculated as a movement starting timing according to the following expression (2):

$$T_0=T_1-T \qquad (2)$$

where $T_1$ is the machining start time of tool on the reference timing, i.e., the time when the tool starts moving from the machining operation starting position $P_1$ into the machining area D as instructed by the machining program. Thus calculated movement starting time $T_0$ is stored into the timing table (see FIG. 2) in the movement data editing portion 22.

Figure 4:
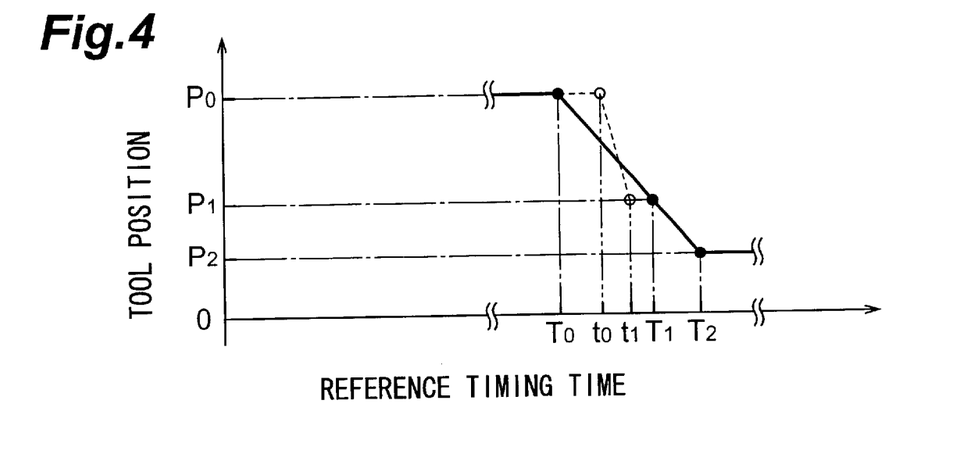
FIG. 4 is a graph showing, as a time chart, contents of data stored in the timing table shown in FIG. 2.

FIG. 4 is a graph showing, as a time chart, contents of data stored in the timing table in the movement data editing portion 22 and contents stored in the timing table in the machining program storage section 14. The abscissa is a time base, whereas the ordinate indicates the position of tool 101. The contents of data stored in the timing table in the movement data editing portion 22 are expressed by a solid line, whereas the contents of data stored in the timing table in the machining program storage section 14 are expressed by a broken line.

As can be seen from the time chart shown in FIG. 4, the locus of tool 101 indicated by the solid line is linear over the duration of timings $T_0$, $T_1$, and $T_2$. Namely, the moving speed in the non-machining area at the timings $T_0$ to $T_1$ is at the same value as that in the machining area D at the timings $T_1$ to $T_2$, and the timing $T_0$ is determined as such according to the above-mentioned calculation processing operation for the movement starting timing. The locus of tool 101 indicated by the broken line, on the other hand, starts at timing $t_0$ located at a time later than that of timing $T_0$, once stops at timing $t_1$, i.e., stops after moving at the rapid feeding speed and then waits until the advent of timing $T_1$, and forms the same locus as the solid line thereafter for machining.

Now, with reference to FIGS. 5 to 12, an example of series of machining processes by the automatic lathe L in this embodiment will be explained.

Figure 5:
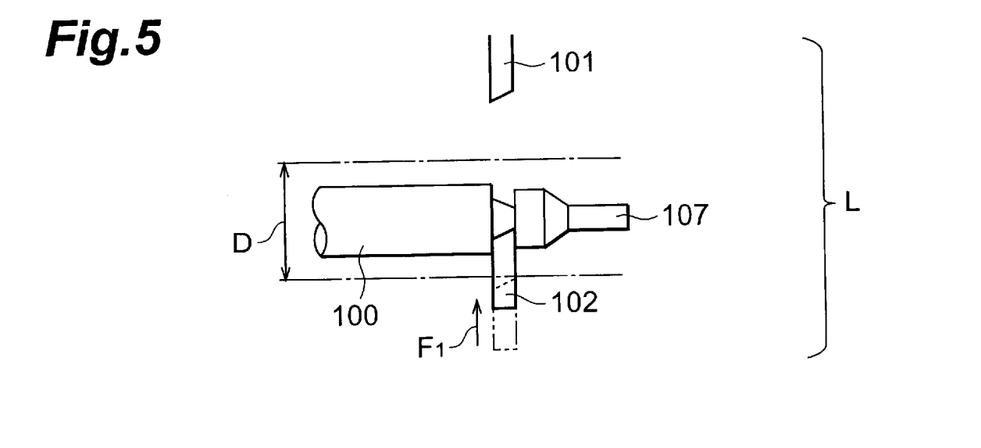
FIG. 5 is a view for explaining an example of machining processes by the control apparatus for an automatic lathe in accordance with the embodiment of the present invention.
Figure 6:
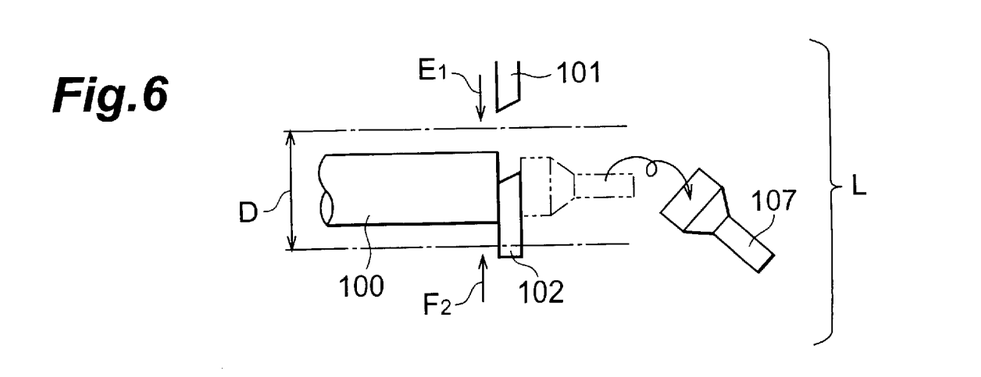
FIG. 6 is a view for explaining an example of machining processes by the control apparatus for an automatic lathe in accordance with the embodiment of the present invention.

First, FIG. 5 shows a "cutting-off process" in which the tool 102 severs an article 107 from the workpiece 100. The tool 102 moves at a predetermined machining speed in the direction of arrow $F_1$ from the machining operation starting position indicated by dash-double-dot lines. The tool 101 is located at the retracted position $P_0$ (see FIG. 13 or 14). Then, as shown in FIG. 6, the tool 102 moves in the direction of arrow $F_2$, whereby the article 107 is completely cut off. While the tool 102 moves in the direction of arrow $F_2$, the tool 101 has already moved in the direction of arrow $E_1$ from the retracted position. The movement starting timing $T_0$ is calculated by the above-mentioned calculation processing operation for the movement starting timing. The advancing (moving) speed is set at the machining moving speed of tool 101.

Figure 7:
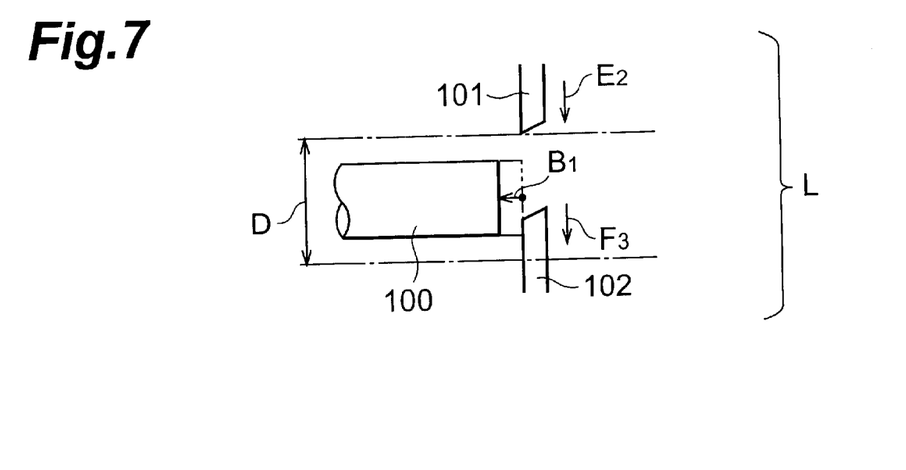
FIG. 7 is a view for explaining an example of machining processes by the control apparatus for an automatic lathe in accordance with the embodiment of the present invention.

FIG. 7 shows a state where initial positioning for carrying out the subsequent machining process is effected. The tool 101 to be involved with the subsequent machining process moves in the direction of arrow $E_2$ at a machining moving speed $V_1$ of the tool 101 within the machining area D, thereby reaching the machining operation starting position, the edge $P_1$ (see FIG. 14) of machining area D. At the same time, the workpiece 100 moves in the direction of arrow $B_1$, to the position indicated by the solid line. Here, the tool 102 continuously moves in the direction of arrow $F_3$.

Figure 8:
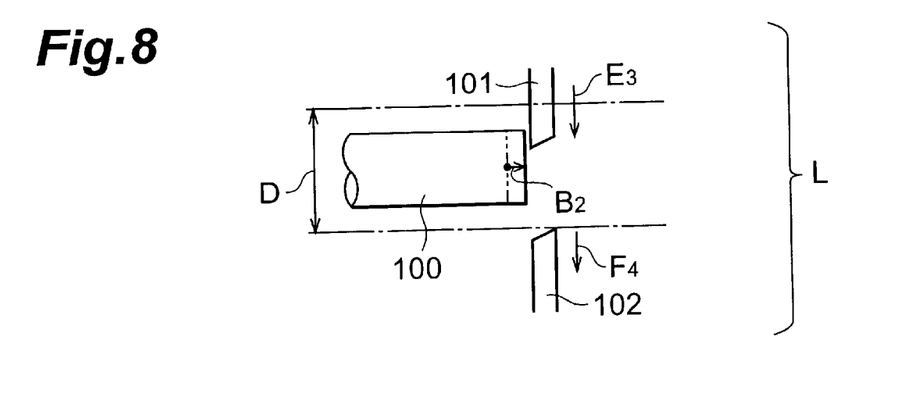
FIG. 8 is a view for explaining an example of machining processes by the control apparatus for an automatic lathe in accordance with the embodiment of the present invention.
Figure 9:
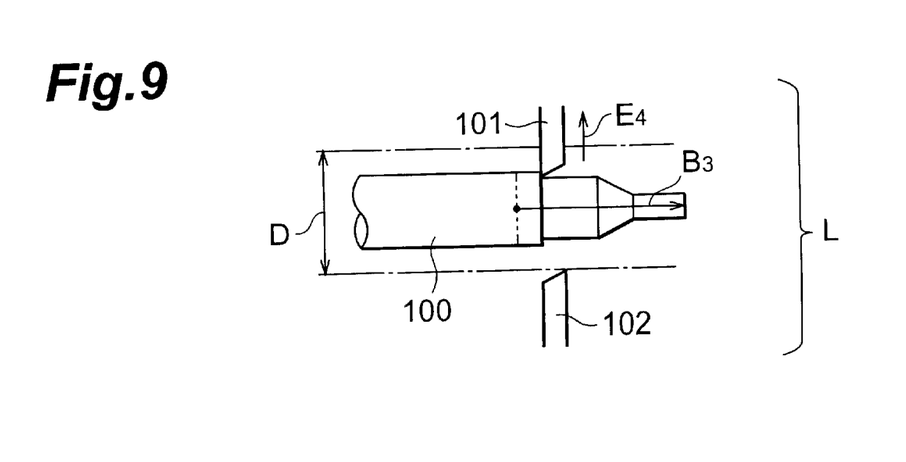
FIG. 9 is a view for explaining an example of machining processes by the control apparatus for an automatic lathe in accordance with the embodiment of the present invention.

FIG. 8 shows a state immediately before starting a "rough-cutting process" by the tool 101. The tool 101 continuously moves in the direction of arrow $E_3$ at the machining moving speed $V_1$ of tool 101, thereby reaching a position immediately before starting an actual machining operation. At the same time, the workpiece 100 moves in the direction of arrow $B_2$, thereby reaching a position immediately before starting the actual machining operation. The tool 102 has reached the edge of machining area D. FIG. 9 shows a state where the "rough-cutting process" by the tool 101 is completed. The workpiece 100 moves in the direction of arrow $B_3$, thereby reaching its actual machining operation ending position. During this period, the tool 101 moves in the direction of arrow $E_4$ according to the machining program as the time passes. The tool 102 remains at the edge of machining area D.

Figure 10:
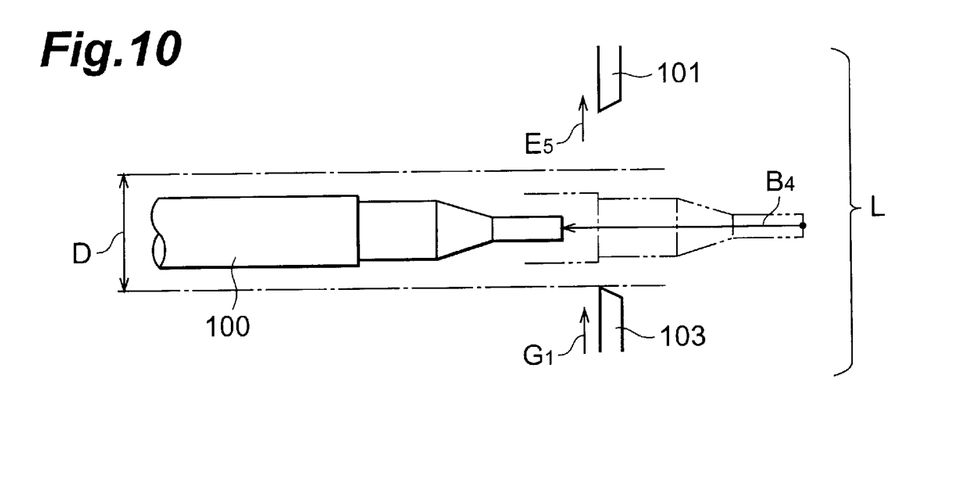
FIG. 10 is a view for explaining an example of machining processes by the control apparatus for an automatic lathe in accordance with the embodiment of the present invention.

FIG. 10 shows a state where initial positioning for carrying out the subsequent "finishing process" by the tool 103 is effected. The tool 103 moves at a machining moving speed $V_2$ of tool 103 within the machining area D in the direction of arrow $G_1$, thereby reaching the edge of machining area D. At the same time, the workpiece 100 moves in the direction of arrow $B_4$, thereby reaching a position indicated by the solid line. The tool 101 returns in the direction of arrow $E_5$ at the machining moving speed $V_1$ of tool 101.

Figure 11:
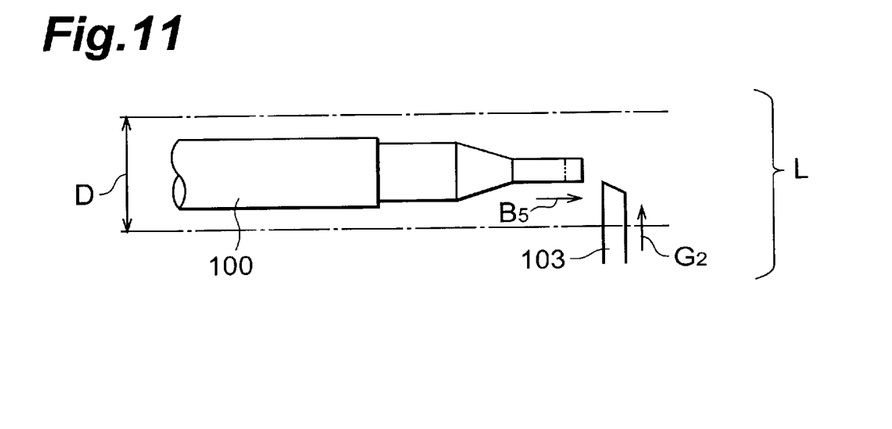
FIG. 11 is a view for explaining an example of machining processes by the control apparatus for an automatic lathe in accordance with the embodiment of the present invention.

FIG. 11 shows a state immediately before starting the "finishing process" by the tool 103. The tool 103 continuously moves at the machining moving speed $V_2$ of tool 103 in the direction of arrow $G_2$, thereby reaching a position immediately before starting the actual machining operation. At the same time, the workpiece 100 moves in the direction of arrow $B_5$, thereby reaching a position immediately before starting the actual machining operation.

Figure 12:
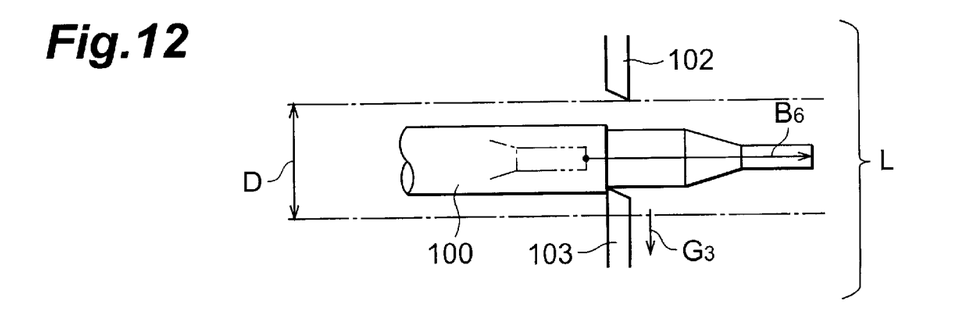
FIG. 12 is a view for explaining an example of machining processes by the control apparatus for an automatic lathe in accordance with the embodiment of the present invention.

Finally, FIG. 12 shows a state where the "finishing process" by the tool 103 is completed. The workpiece 100 moves in the direction of arrow $B_6$, thereby reaching its actual machining operation ending position. During this period, the tool 103 moves in the direction of arrow $G_3$ according to the machining program as the time passes. The tool 102 waits as it is in the state located at the edge of machining area D (state shown in FIG. 9). Thereafter, the tool 103 returns to the retracted position in order to keep it from interfering with the tool 101, whereas the machining process can return to the "cutting-off process" by the tool 102 shown in FIG. 5.

In FIG. 5, the explanation is started from the state where the tool 102 is located at the machining starting position indicated by dash-double-dot lines. This is because of the fact that, as shown in FIG. 14, the tool 102 is located at a position separated from the other tools 101, 103, whereby there is no fear of interference even when the tool 102 is located at the machining starting position indicated by dash-double-dot lines. When such an arrangement cannot be attained, the tool 102 must start from its most retracted position. In this case, the movement starting timing of tool 102 is calculated, as in the other tools 101, 103, such that, after starting the movement, the tool 102 completes the movement at the moving speed for cutting-off machining at the time when the cutting-off machining of tool 102 is completed. The movement starting timing of tool 102 can be determined by the calculation processing operation shown in FIG. 3, whereby the moving speed of tool 2 becomes the cutting-off machining moving speed by the tool 102 instructed by the machining program.

When the tool 102 is moved according to thus determined movement starting timing of tool 102, such a movement starting timing cannot be corrected if the tool 102 might interfere with the other tools 101, 103. Therefore, in this case, the tool 102 may be moved at the movement starting timing instructed by the machining program, or an appropriate timing with no interference may be reset between the determined movement starting timing and the movement starting timing instructed by the machining program.

Though the machining operation starting positions are uniformly located on the edge of the machining area D wider than the outside diameter of workpiece 100 in this embodiment, they may be respectively set for the individual tools 101, 102, 103 in conformity with the sizes of tools and article 107.

Thus, when the tools 101, 103 to be chosen in the later machining processes are moved so as to reach their machining operation starting positions between two consecutive machining processes, the moving speed of tools 101, 103 is changed to a predetermined speed lower than that instructed beforehand by the machining program. As a consequence, abrasion is reduced in parts used with conventional rapid feeding operations in tool moving mechanisms. Therefore, the residual vibration of tools 101, 103 decreases when a rapid feeding operation switches to a machining operation in the vicinity of their machining operation starting positions, whereby operations of tools 101, 103 are stabilized near their machining operation starting positions. As a result of these, the machining accuracy of workpiece 100 can be restrained from deteriorating.

The editing section 21 (movement data editing portion 22) determines the movement starting timings of tools 101, 103 such that the tools 101, 103 chosen in the later machining processes reach their corresponding machining operation starting positions at machining operation timings instructed beforehand by the machining program and at a predetermined speed lower than a speed instructed beforehand by the machining program. As a consequence, the machining time required for machining the workpiece 100 into a desirable form is restrained from increasing.

In particular, concerning two consecutive machining processes, the later machining process (e.g., the machining process by the tool 101) is started before the earlier machining process (e.g., the machining process by the tool 102) is completed, i.e., the tool (e.g., tool 101) chosen in the later machining process starts moving from its machining operation starting position on the edge of the machining area D when the tool (e.g., tool 102) chosen in the earlier machining process retracts from the machining area D. As a consequence, the total machining time required for machining the workpiece 100 into a desirable form can be shortened.

In the control apparatus 1 of this embodiment, the predetermined speed defined by the editing section 21 (movement data editing portion 22) is the machining moving speed of tools 101, 103 from their machining operation starting positions instructed by the machining program, whereby the moving speed of tools 101, 103 to their machining operation starting positions can easily be determined in a simple manner. Also, since the tools 101, 103 reach the machining operation starting positions at the machining moving speed, and enter the machining area D to carry out the machining process at the same speed, operations of tools 101, 103 become more stable, whereby the machining accuracy can further be improved.

In the control apparatus 1 of this embodiment, the interference checker 23 determines whether interference occurs or not among individual movable parts in mechanisms of the automatic lathe when the machining proceeds according to the timing table edited by the movement data editing portion 22 as shown in FIG. 2, and only the data determined to generate no interference are defined and stored in the movement data editing portion 22. As a consequence, the tools 101, 103 can securely be prevented from interfering with the workpiece 100 and tool 102.

When the tools 101, 103 in the control apparatus 1 of this embodiment are moved at the machining moving speed so as to be positioned at the machining operation starting position, if the moving speed of workpiece 100 can be corrected such that the workpiece 100 is positioned simultaneously with the positioning timing of tools 101, 103, unnecessary operations such as those of moving the workpiece 100 at a high speed and causing it to wait until the tools 101, 103 arrive will be eliminated. As a consequence, the load of a driving source for moving the workpiece 100 can be cut down.

Without being restricted to the embodiment mentioned above, the present invention is also applicable to cases where machining processes other than the above-mentioned "cutting-off process," "rough-cutting process," and "finishing process" are carried out.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A control apparatus for an automatic lathe for successively choosing a plurality of tools one by one and machining a workpiece into a desirable form according to a machining program, said control apparatus comprising:
   storage means for storing said machining program;
   editing means for editing movement data of said tools according to said machining program stored in said storage means; and
   control means for controlling a moving operation of said tools according to said movement data edited by said editing means;
   wherein said machining program includes at least a program for instructing a first machining process by a first tool and a program for instructing a second machining process by a second tool carried out subsequently to said first machining process; and
   wherein said editing means determines a movement starting timing of said second tool such that at least said second tool reaches a machining operation starting position at a machining operation timing instructed by said machining program and at a predetermined speed lower than a speed instructed by said machining program, when said workpiece and said second tool are caused to reach respective machining operation starting positions in said second machining process after said first machining process is completed, and said editing means defines the movement starting timing and said predetermined speed as said movement data.

2. A control apparatus for an automatic lathe according to claim 1, wherein said predetermined speed defined by said editing means is a machining moving speed of said second tool from said machining operation starting position in said second machining process instructed by said machining program.

3. A control apparatus for an automatic lathe according to claim 2, wherein said editing means determines whether said second tool interferes with said workpiece and said first tool or not after said second tool is started to move at said movement starting timing until said second tool reaches said machining operation starting position, and defines said movement starting timing and said predetermined speed as said movement data when it is determined not.

4. A control apparatus for an automatic lathe according to claim 1, wherein said editing means determines whether said second tool interferes with said workpiece and said first tool or not after said second tool is started to move at said movement starting timing until said second tool reaches said machining operation starting position, and defines said movement starting timing and said predetermined speed as said movement data when it is determined not.

* * * * *